United States Patent
Patel et al.

(10) Patent No.: US 9,526,050 B2
(45) Date of Patent: Dec. 20, 2016

(54) METHOD AND APPARATUS FOR NEIGHBOR CELL TRACKING

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 227 days.

(21) Appl. No.: 14/543,090

(22) Filed: Nov. 17, 2014

(65) Prior Publication Data

US 2015/0139190 A1    May 21, 2015

Related U.S. Application Data

(60) Provisional application No. 61/905,285, filed on Nov. 18, 2013.

(51) Int. Cl.
*H04W 36/00* (2009.01)

(52) U.S. Cl.
CPC ........... *H04W 36/0094* (2013.01); *Y02B 60/50* (2013.01)

(58) Field of Classification Search
CPC combination set(s) only.
See application file for complete search history.

(56) References Cited

U.S. PATENT DOCUMENTS

| | | | |
|---|---|---|---|
| 6,853,616 B1 | 2/2005 | Kim et al. | |
| 6,928,048 B1 | 8/2005 | Do et al. | |
| 8,767,708 B2 * | 7/2014 | Krishnamurthy | H04J 11/005 370/350 |
| 9,066,257 B2 * | 6/2015 | Xu | H04W 24/08 |
| 9,131,389 B2 * | 9/2015 | Choi | H04W 24/00 |
| 9,167,519 B2 * | 10/2015 | Damji | H04W 52/0225 |
| 2008/0069252 A1 | 3/2008 | Wenzhen et al. | |
| 2008/0101488 A1 | 5/2008 | Wilhelmsson et al. | |
| 2010/0069066 A1 * | 3/2010 | Shen | H04J 11/0093 455/434 |

(Continued)

OTHER PUBLICATIONS

Qian et al, Performance Evaluation of Reference Signal Received Power Strength Based Idle Users' Cell Selection in 3GPP LTE, IEEE, 5 pages, 2013.*

(Continued)

*Primary Examiner* — Frank Duong
(74) *Attorney, Agent, or Firm* — Lerner, David, Littenberg, Krumholz & Mentlik, LLP

(57) ABSTRACT

The client terminals in a mobile wireless communication system typically continually search and keep track of the neighbor cells surrounding the cell from which it may be receiving service. Keeping track of neighbor cells by the client terminal may require periodic measurements on the neighbor cells and these measurements contribute to power consumption in the client terminal. The power consumption for neighbor cell measurements is an important factor when the client terminal either actively receiving service from the network or in standby mode when the client terminal is not actively receiving service from the network. A method and apparatus are presented that enable the client terminal to keep track of the neighbor cells with reduced measurements and thereby with reduced power consumption.

20 Claims, 9 Drawing Sheets

(56) References Cited

U.S. PATENT DOCUMENTS

| | | |
|---|---|---|
| 2011/0002403 A1 | 1/2011 | Wilhelmsson et al. |
| 2012/0307820 A1* | 12/2012 | Tomatis ............. H04B 1/70755 370/350 |
| 2015/0139190 A1 | 5/2015 | Patel et al. |

OTHER PUBLICATIONS

Proakis, John G. et al., "Digital Communications" (2007) 12:35 Fifth Edition.

* cited by examiner

METHOD AND APPARATUS FOR NEIGHBOR CELL TRACKING

CROSS-REFERENCE TO RELATED APPLICATIONS

This application claims the benefit of the filing date of U.S. Provisional Application No. 61/905,285, filed Nov. 18, 2013 and entitled "METHOD AND APPARATUS FOR NEIGHBOR CELL TRACKING," the entire disclosure of which is hereby expressly incorporated by reference herein.

BACKGROUND OF THE INVENTION

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred as the serving base station. In some wireless communication systems the serving base station is normally referred as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred as a neighbor cell.

In order to maintain seamless mobility and uninterrupted service the client terminals in a mobile wireless communication system must continually search and keep track of the neighbor cells surrounding the serving cell from which it may be receiving service. Keeping track of neighbor cells requires periodic measurements on the neighbor cells and these measurements contribute to the power consumption in the client terminals. The power consumption for neighbor cell measurements is an important factor when the client terminal is either actively receiving service from the network or in standby mode when the client terminal is not actively receiving service from the network.

SUMMARY OF THE INVENTION

The present invention is explained through its application to a broadband wireless communication system based on an Orthogonal Frequency Division Multiplexing (OFDM) such as 3rd Generation Partnership Project (3GPP) Long Term Evolution (LTE) standard although the invention is applicable to other OFDM based wireless communication systems such as IEEE 802.16 standard, IEEE 802.20 standard or any other OFDM based standard.

The process of searching and tracking neighbor cells may involve a number of steps. For example, in the case of the 3GPP LTE wireless communication system that is based on OFDM, the Primary Synchronization Signal (PSS) and the Secondary Synchronization Signal (SSS) are provided for detecting the reference timing of the cells. To detect new neighbor cells, the client terminal must periodically perform a search for PSS and SSS. Once the PSS and SSS of a neighbor cell are detected, additional measurements can be made that may be required for considering the neighbor cell for cell reselection or handover purposes.

For coherent detection at the receiver of a wireless communication system, it is necessary to know the precise reference phase, and in some cases the reference amplitude, of the received signal. To facilitate this at the receiver, the transmitter of an LTE wireless communication system embeds a Reference Signal (RS) that can be derived by the receiver based on the Physical Cell Identity (PCI) obtained from PSS and SSS information. The modulation of the RS can be derived from the knowledge of the PCI which can be derived from the detected PSS and SSS as defined in the 3GPP LTE wireless communication system specifications.

Using a 3GPP LTE wireless communication system as an example, the Reference Signal Received Power (RSRP) metric is used for cell reselection and handover decisions. To make the RSRP measurements, the client terminal must know the precise reference timing of the neighbor cells, which can be obtained by the PSS and SSS search procedure. The RSRP measurement is typically performed in the frequency domain since the power contained only in the RS must be estimated. The time domain signal may be converted to frequency domain using a Fast Fourier Transform (FFT). For accurate RSRP measurements, the FFT window position must be correctly aligned with the start of an OFDM symbol containing the RS. If the FFT window position is not correct, it may lead to linear phase distortion in frequency domain. FIG. 2 shows an example of the frequency domain OFDM symbol containing the demodulated RS when the FFT window position is correctly aligned with the true OFDM symbol start position for a 10 MHz channel bandwidth with 600 used subcarriers.

FIG. 3 shows an example of the frequency domain OFDM symbol containing the demodulated RS when the FFT window position is aligned one sample ahead of the true OFDM symbol start position. FIG. 4 shows an example of the frequency domain OFDM symbol containing the demodulated RS when the FFT window position is aligned one sample later than the true OFDM symbol start position. Comparing FIG. 3 and FIG. 4 with FIG. 2, the linear phase distortion in FIG. 3 and FIG. 4 is evident. The linear phase distortion caused by inaccurate reference timing information degrades the RSRP measurement accuracy. The reference timing error estimation and tracking in the client terminal may not be able to maintain correct OFDM symbol boundary under poor signal conditions. The client terminal may be in poor signal conditions when it has to make the handover or cell reselection decisions and the need for accurate RSRP in this scenario is critical. Lack of accurate RSRP measurements may lead to inferior cell reselection and handover performance.

In accordance with aspects of the invention, a method of tracking neighbor cells associated with a wireless device in a wireless communication system is provided. The method comprises receiving, at the wireless device, a plurality of Orthogonal Frequency Division Multiplexing (OFDM) symbols from one or more transmitting devices in the wireless communication system; deriving from the OFDM symbols, using one or more processing devices, initial channel estimates for subcarriers carrying a set of reference signals; determining, using the one or more processing devices, a first metric (R) from the initial channel estimates; determining, using the one or more processing devices, a second metric (R$^+$) from the initial channel estimates, the second metric R$^+$ incorporating a predetermined linear phase distortion corresponding to a timing delay; determining, using the one or more processing devices, a third metric (R$^-$) from the initial channel estimates, the third metric R$^-$ incorporating a predetermined linear phase distortion corresponding to a timing advance; selecting, using the one or more processing devices, a maximum metric from among the first metric R, the second metric R$^+$ and the third metric R$^-$, the selected maximum metric having a corresponding timing offset; estimating from the timing offset, using the one or more processing devices, a reference timing drift for a given one of the neighbor cells; determining, using the one or more processing devices, a reference metric from the maximum metric; and using the estimated reference timing drift and the determined reference metric to assist the wireless communication device in tracking the neighbor cells for handover or cell reselection.

In one example, the first, second and third metrics are either Reference Signal Received Power (RSRP) metrics or Reference Signal Receive Quality (RSRQ) metrics. When the first, second and third metrics are the RSRP metrics, they may be determined using different linear phase offsets from a single frequency domain signal obtained using a single Fast Fourier Transform (FFT).

In another example, the second metric R+ is determined using a predetermined Fast Fourier Transform (FFT) length, in which the predetermined linear phase distortion delay corresponds to an opposite of one sample delay in a window position of the FFT; and the third metric R− is determined using the predetermined FFT length, in which the predetermined linear phase distortion advance corresponds to an opposite of one sample advance in the window position of the FFT.

In a further example, an FFT position offset corresponding to the selected maximum metric is identified as an error or drift in a position of the given neighbor cell. In this case, the method may further comprise using the FFT position offset to obtain a new estimate of reference timing of the given neighbor cell by updating a previous reference timing by an amount equal to the timing offset.

In yet another example, the method further comprises updating reference timing of the given neighbor cell without using Primary Synchronization Signal (PSS) and Secondary Synchronization Signal (SSS) detection for already-identified neighbor cells. In this case, the method may further comprise using the updated reference timing of a selected neighbor cell when performing a next power measurement on the selected neighbor cell.

In accordance with other aspects of the invention, a wireless communication apparatus is configured to track neighbor cells in a wireless communication system. The apparatus comprises a plurality of receive chains configured to receive signals including a plurality of Orthogonal Frequency Division Multiplexing (OFDM) symbols from a transmitting device and one or more processing devices operatively coupled to the plurality of receive chains. The one or more processing devices are configured to: derive, from the OFDM symbols, initial channel estimates for subcarriers carrying a set of reference signals; determine a first metric (R) from the initial channel estimates; determine a second metric (R$^+$) from the initial channel estimates, the second metric R$^+$ incorporating a predetermined linear phase distortion corresponding to a timing delay; determine a third metric (R$^-$) from the initial channel estimates, the third metric R$^-$ incorporating a predetermined linear phase distortion corresponding to a timing advance; select a maximum metric from among the first metric R, the second metric R$^+$ and the third metric R$^-$, the selected maximum metric having a corresponding timing offset; estimate, from the timing offset, a reference timing drift for a given one of the neighbor cells; determine a reference metric from the maximum metric; and use the estimated reference timing drift and the determined reference metric to assist the wireless communication apparatus in tracking the neighbor cells for handover or cell reselection.

In one example, the first, second and third metrics are Reference Signal Received Power (RSRP) metrics determined using different linear phase offsets from a single frequency domain signal obtained using a single Fast Fourier Transform (FFT).

In another example, the second metric R+ is determined using a predetermined Fast Fourier Transform (FFT) length, in which the predetermined linear phase distortion delay corresponds to an opposite of one sample delay in a window position of the FFT; and the third metric R− is determined using the predetermined FFT length, in which the predetermined linear phase distortion advance corresponds to an opposite of one sample advance in the window position of the FFT. In this case, an FFT position offset corresponding to the selected maximum metric may be identified as an error or drift in a position of the given neighbor cell.

In a further example, the one or more processing devices are further configured to update reference timing of the given neighbor cell without using Primary Synchronization Signal (PSS) and Secondary Synchronization Signal (SSS) detection for already-identified neighbor cells. Here, the one or more processing devices may be further configured to use the updated reference timing of a selected neighbor cell when performing a next power measurement on the selected neighbor cell.

In accordance with further aspects of the invention, a wireless communication receiver element is configured to track neighbor cells in a wireless communication system. The wireless communication receiver element comprises one or more processing devices configured to obtain, from a plurality of receive chains of a wireless communication device, a plurality of received Orthogonal Frequency Division Multiplexing (OFDM) symbols. The one or more processing devices are configured to: derive, from the OFDM symbols, initial channel estimates for subcarriers carrying a set of reference signals; determine a first metric (R) from the initial channel estimates; determine a second metric (R+) from the initial channel estimates, the second metric R+ incorporating a predetermined linear phase distortion corresponding to a timing delay; determine a third metric (R−) from the initial channel estimates, the third metric R− incorporating a predetermined linear phase distortion corresponding to a timing advance; select a maximum metric from among the first metric R, the second metric R+ and the third metric R−, the selected maximum metric having a corresponding timing offset; estimate, from the timing offset, a reference timing drift for a given one of the neighbor cells; determine a reference metric from the maximum metric; and use the estimated reference timing drift and the determined reference metric to assist the wireless communication device in tracking the neighbor cells for handover or cell reselection.

In one example, the first, second and third metrics are Reference Signal Received Power (RSRP) metrics determined using different linear phase offsets from a single frequency domain signal obtained using a single Fast Fourier Transform (FFT).

In another example, the second metric R+ is determined using a predetermined Fast Fourier Transform (FFT) length, in which the predetermined linear phase distortion delay corresponds to an opposite of one sample delay in a window position of the FFT; and the third metric R− is determined using the predetermined FFT length, in which the predetermined linear phase distortion advance corresponds to an opposite of one sample advance in the window position of the FFT. In this case, an FFT position offset corresponding to the selected maximum metric may be identified as an error or drift in a position of the given neighbor cell.

In yet another example, the one or more processing devices are further configured to update reference timing of the given neighbor cell without using Primary Synchronization Signal (PSS) and Secondary Synchronization Signal (SSS) detection for already-identified neighbor cells. In this case, the one or more processing devices may be further configured to use the updated reference timing of a selected neighbor cell when performing a next power measurement on the selected neighbor cell.

DETAILED DESCRIPTION

Figure 1:
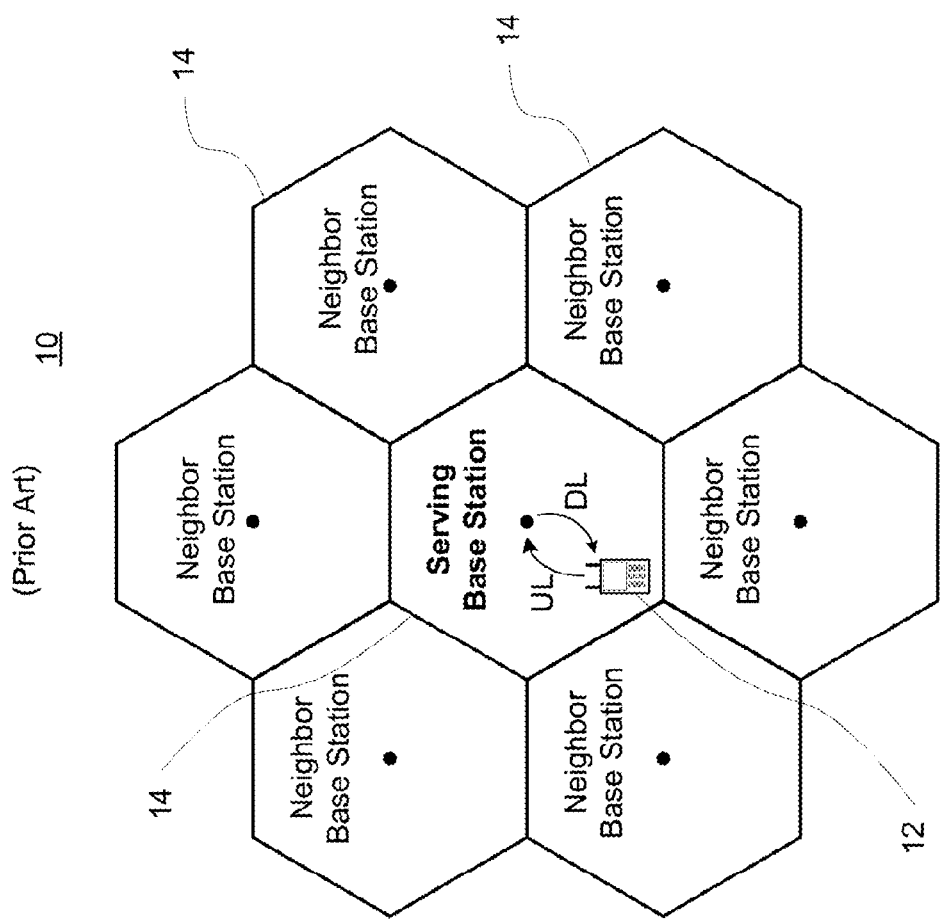
FIG. 1 illustrates a conventional wireless cellular communication system.
Figure 2:
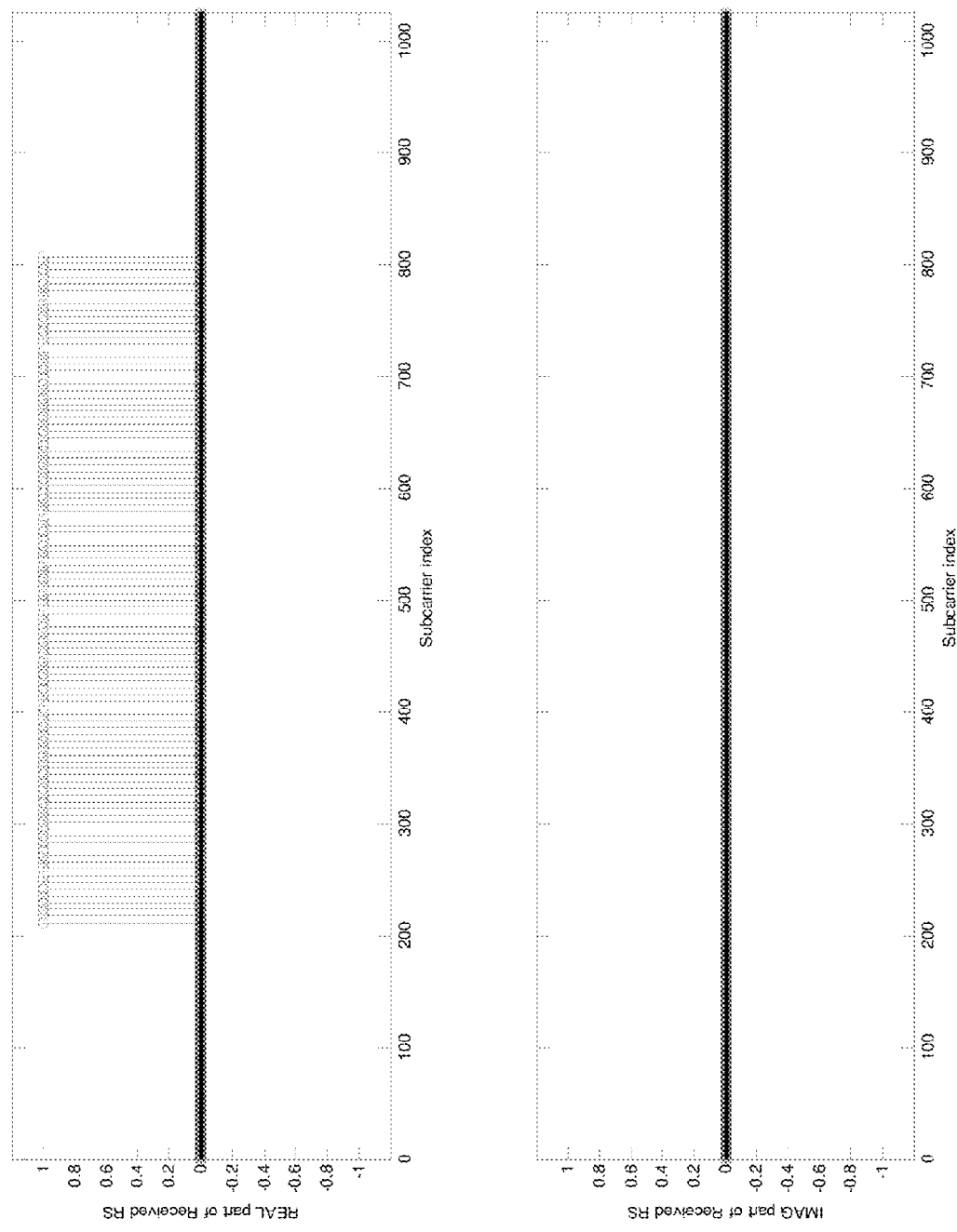
FIG. 2 illustrates an example of a frequency domain signal containing a demodulated Reference Signal with FFT window at the correct OFDM symbol boundary.
Figure 3:
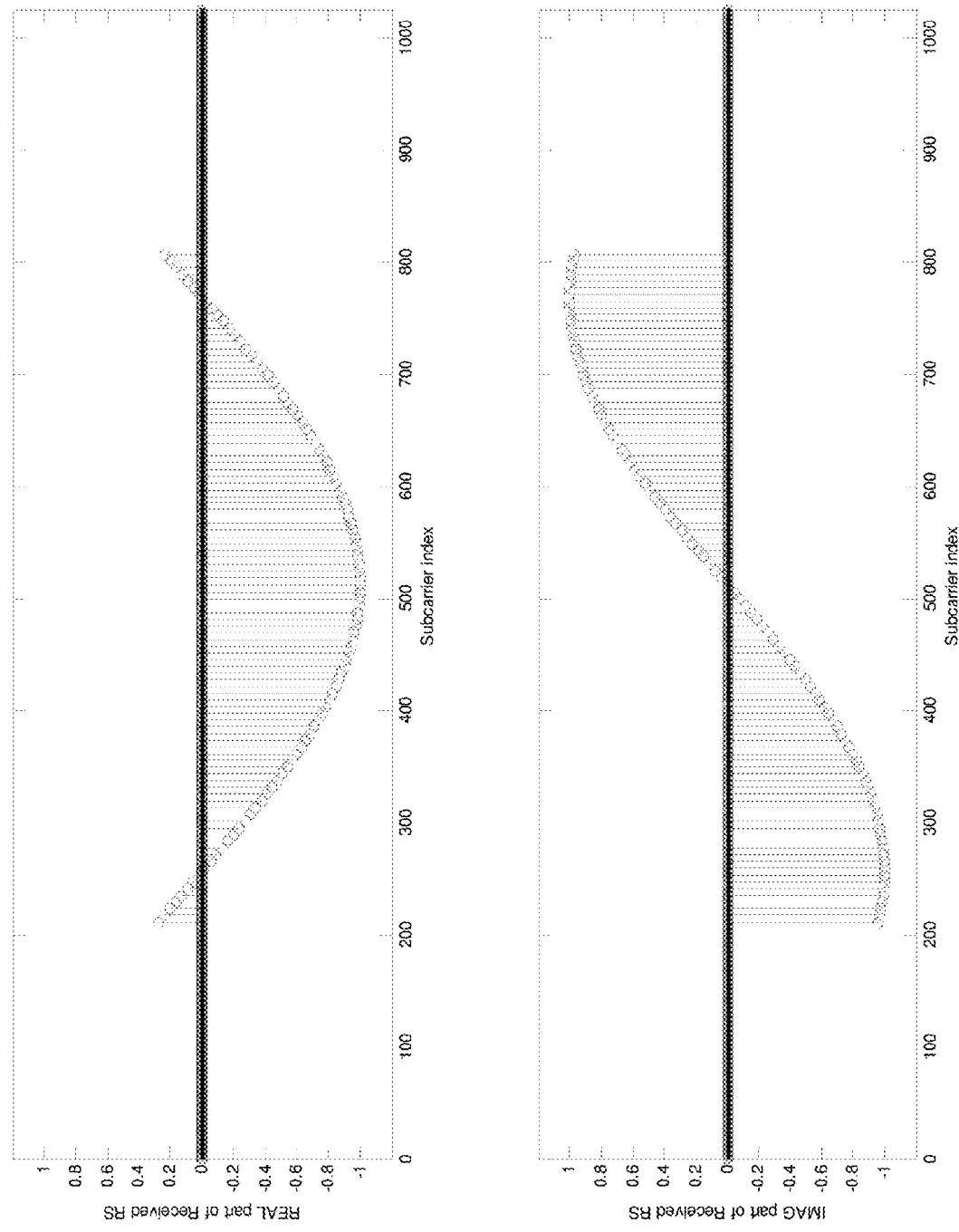
FIG. 3 illustrates an example of a frequency domain signal containing a demodulated Reference Signal where FFT window position is aligned one sample ahead of the true OFDM symbol start position.
Figure 4:
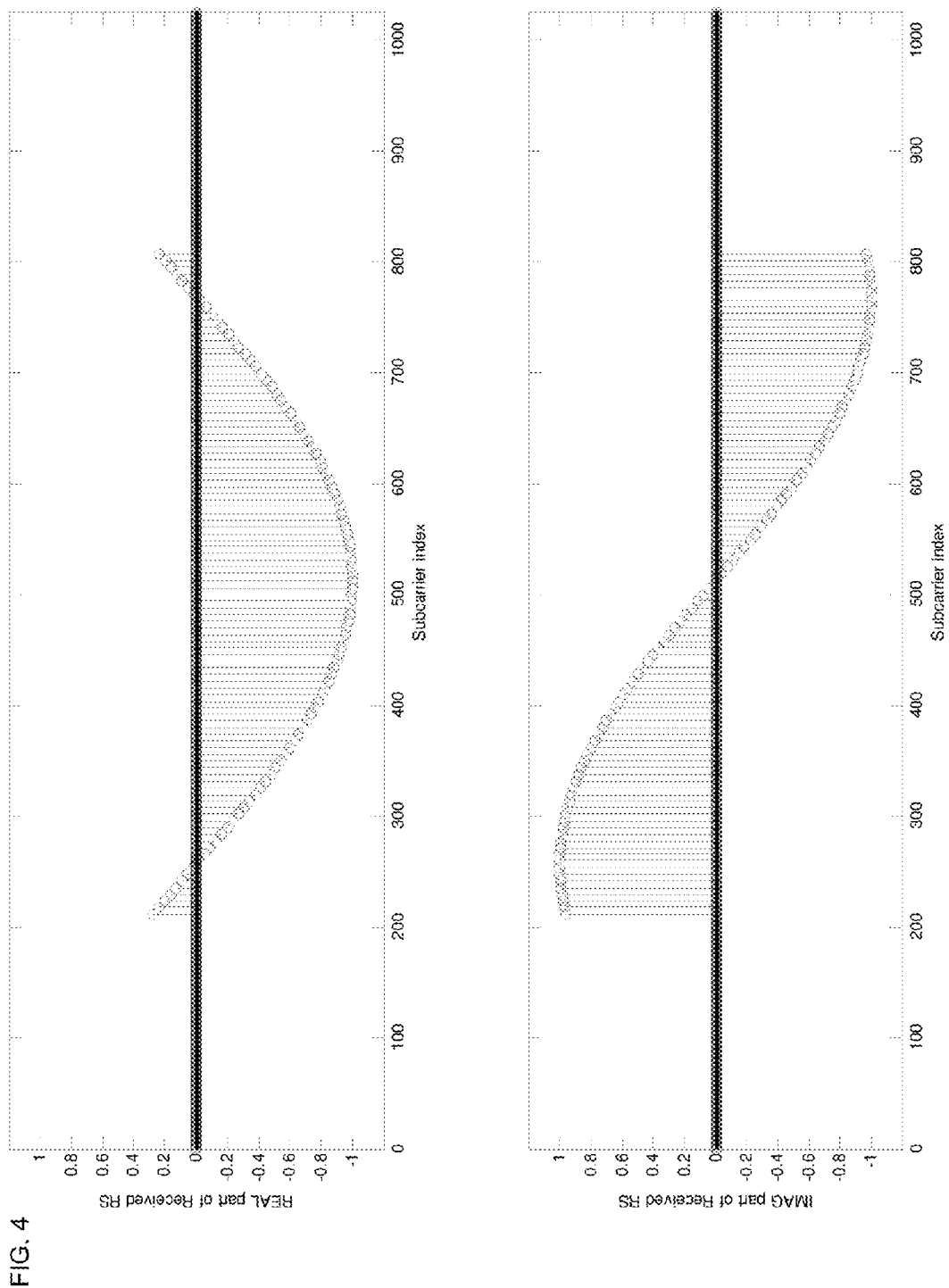
FIG. 4 illustrates an example of a frequency domain signal containing a demodulated Reference Signal where FFT window position is aligned one sample behind the true OFDM symbol start position.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

In mobile wireless communication systems, as the client terminals are mobile, their position relative to the serving cell and neighbor cells may change continually. The change in position may lead to changes in propagation delays and the reference timing as observed by the client terminal. For the client terminal to make accurate neighbor cell measurements required for cell reselection and handovers, it must periodically update its estimate of neighbor cell reference timing.

For example, in case of the 3GPP LTE based OFDM system, the detection of neighbor cells reference timing requires performing periodic PSS and/or SSS detection. The actual measurements required for cell reselection and handovers are the RSRP measurements on the neighbor cells whose PCI and reference timing are known. Generally, the RSRP measurements may need to be performed more frequently than the PSS and SSS detection. For example, the RSRP measurements may be performed once every 100 ms whereas the PSS and SSS detection may be performed less frequently such as once every second.

The rate at which the PSS and SSS detection may need to be performed depends on a number of factors including the mobility of the client terminal, which is a major factor. For the case of a client terminal travelling directly towards or away from the base station, the change of its position relative to the serving cell and neighbor cells will be the highest. This change of position in turn leads to a change of propagation delay, and therefore a change in reference timing of the serving and neighbor cells for the client terminal. For a client terminal travelling at 250 Km/h, the position changes by about 69 meters per second. This in turn changes the propagation delay by about 0.23 µs considering that radio waves propagate at the speed of light (about 3*108 meters/second).

In the case of a 3GPP LTE OFDM wireless communication system, the RSRP measurements are typically performed on a signal whose channel bandwidth and the sampling rate may vary from 1.92 Msps for 1.4 MHz channel bandwidth to 30.72 Msps for 20 MHz channel bandwidth. The corresponding sample period varies from 0.52 µs to 0.0325 µs. For the case of a 30.72 Msps sample rate, the change in propagation delay by 0.23 µs corresponds to about 7 samples offset from the true reference timing position. If the RSRP measurements are performed with reference timing estimate that is only one second old, the linear phase distortion may be high enough to cause inaccuracy of several dB in the RSRP measurements. If the RSRP measurements are performed using a signal with 1.92 Msps sample rate, the linear phase distortion may be less but even for that lower sample rate this offset is sufficient to cause degradation in the RSRP measurement accuracy.

To avoid the degradation in RSRP measurement accuracy may require the PSS and/or SSS detection to be performed more frequently in order to keep track of the neighbor cells reference timing. Note that the client terminal may be performing normal receive operation for the serving cell and from that it can make reference timing error estimation and correct the timing to align itself with serving cell. However, for the neighbor cells the client terminal typically may rely on the PSS and/or SSS detection of the neighbor cell to keep track of the neighbor cell reference timing.

A method and apparatus are disclosed for the client terminal to be able to perform accurate RSRP measurements without requiring more frequent PSS and/or SSS detection. According to an aspect of the present invention, the client terminal may perform multiple RSRP estimations using different linear phase offsets from a single frequency domain signal obtained using single FFT operation.

In the frequency domain, let the a priori known modulation information in the nth OFDM symbol for the kth RS subcarrier be denoted by s(n, k) and the received signal at nth OFDM symbol for the kth RS subcarrier be denoted by r(n, k). The Least Squares (LS) channel estimate $\hat{h}(n,k)$ at the nth OFDM symbol for the $k^{th}$ RS subcarrier is given by:

$$\hat{h}(n, k) = \frac{r(n, k)}{s(n, k)} \quad (1)$$

The RSRP may be estimated by using the LS channel estimates $\hat{h}_k$ for the RS subcarriers. An example of such a method is computing the correlation $R_k$ where the adjacent LS channel estimates for the RS subcarriers are correlated as follows to compute the RS power:

$$R(n,k)=\hat{h}(n,k)\hat{h}(n,k+1) \quad (2)$$

The correlation over all available RS subcarrier pairs within a single OFDM symbol may be computed and averaged to get a reliable estimate of the RS power as shown below in EQ. (3) where K is the number of RS pairs.

$$R(n) = \frac{1}{K}\sum_{k=0}^{K-1} R_k = \frac{1}{K}\sum_{0}^{K-1} \hat{h}(n, k)\hat{h}(n, k+1) \quad (3)$$

This estimated RSRP includes any linear phase distortion due to possibly incorrect FFT window alignment with respect to the true OFDM symbol boundary.

According to an aspect of the present invention, the RSRP using correlation of the estimated channel of adjacent RS subcarriers in frequency domain is performed with three different settings:

1) Estimate RSRP R(n) as shown in EQ. (3).
2) Estimate RSRP $R^+(n)$ after introducing the linear phase distortion corresponding to the opposite of one sample delay in the FFT window position. Specifically, $$R^+(n)=\Sigma_{k=0}^{K-1} R_k^+ = \Sigma_0^{K-1}\hat{h}(n,k)\hat{h}(n,k+1)e^{j2\pi/L} \quad (4)$$

where L is the length of the FFT, which in turn depends on the channel bandwidth and sampling rate. For example, in the case of a 20 MHz channel with a sampling rate of 30.72 Msps, the value of L is 2048. In the case of a 1.4 MHz channel with a sampling rate of 1.92 Msps, the value of L is 128.

3) Estimate RSRP R (n) after introducing the linear phase distortion corresponding to the opposite of one sample advance in FFT window position. Specifically, $$R^-(n)=\Sigma_{k=0}^{K-1} R_k^- = \Sigma_{k=0}^{K-1} \hat{h}_k \hat{h}_{k+1}{}^* e^{-j2\pi/L} \quad (5)$$

According to an aspect of the present invention, after the RSRP based on the three metrics R(n), $R^+(n)$, and R (n) specified above are computed, the RSRP corresponding to the metric with the highest magnitude of the three candidates is considered to be the most accurate estimate of the RSRP among the three candidates. According to another aspect of the present invention, the FFT position offset corresponding to the highest RSRP is considered to be the error or drift in the position of the neighbor cell. According to a further aspect of the present invention, this offset is used to obtain the new estimate of the neighbor cell reference timing by updating the previous reference timing by the amount equal to the estimated offset. According to yet another aspect of the present invention, the reference timing of the neighbor cell is updated without requiring PSS and/or SSS detection for already identified neighbor cells. According to a further aspect of the present invention, the updated reference timing of the neighbor cell may be used when performing the next RSRP measurement on that cell. The same procedure may be applied to all the neighbor cells individually because the direction of movement of the client terminal may be different relative to different neighbor cells. The tracking of the neighbor cell timing drift based on RSRP estimation with different linear phase distortion provides accurate RSRP and reference timing information which may lead to improved cell reselection and handover performance. This can be a substantial advantage for portable wireless communication devices such as a cellular phone, laptop, netbook, etc.

This improved processing may be performed by one or more DSPs, microcontrollers, hardware accelerators, co-processors or a combination of any of such processing devices, which receive signals from multiple receive chains. This may be done in conjunction with internal memory, including a stack or buffer memory, with external memory, or both.

Figure 5:
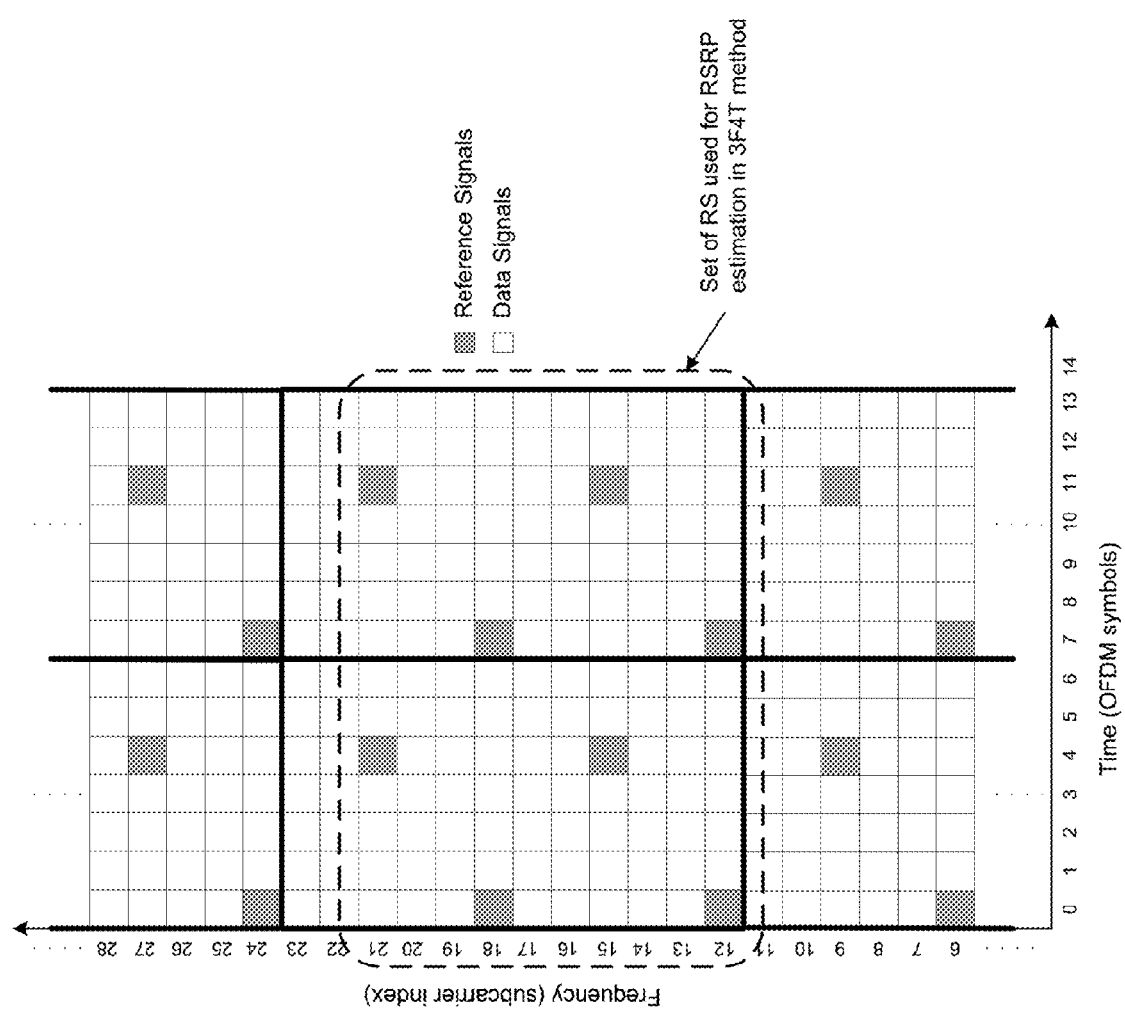
FIG. 5 illustrates an example of a 3F4T method of estimating RSRP, which may be employed with aspects of the invention described herein.

According to an aspect of the present invention, the method of finding the most accurate RSRP using three different linear phase offsets and estimating the reference timing drift may be applied to other methods of computing the RSRP. For example, the RSRP may be computed by performing a linear combination of few RS subcarriers within and across few OFDM symbols in the vicinity of each RS subcarrier and then the filtered RS estimates obtained by the averaging may then be used for RSRP computation. For example, three RS subcarriers and four OFDM symbols carrying the RS may be used to estimate RS magnitude and power. This method is referred herein as "3F4T" and is illustrated in FIG. 5. According to the aspects of the present invention, the RSRP may be computed using the 3F4T method with three different inputs: the normal channel estimates, the channel estimates with linear phase distortion corresponding to the opposite of one sample delay in FFT window position, and the channel estimates with linear phase distortion corresponding to the opposite of one sample advance in FFT window position. The RSRP corresponding to the highest absolute value of 3F4T metrics is considered to be the most accurate estimate of the RSRP among the three candidates. Similar to the correlation method, the FFT position offset corresponding to the highest RSRP is considered to be the error or reference timing drift in the position of the neighbor cell. According to an aspect of the present invention, the number of different differential correlations to be performed corresponding to different reference timing offsets may be configurable. This enables complexity versus performance tradeoff. For example, if the RSRP is measured less frequently, more reference timing offsets may be considered. At a minimum, three different RSRP measurements with three different reference timing offsets may be required.

Figure 6:
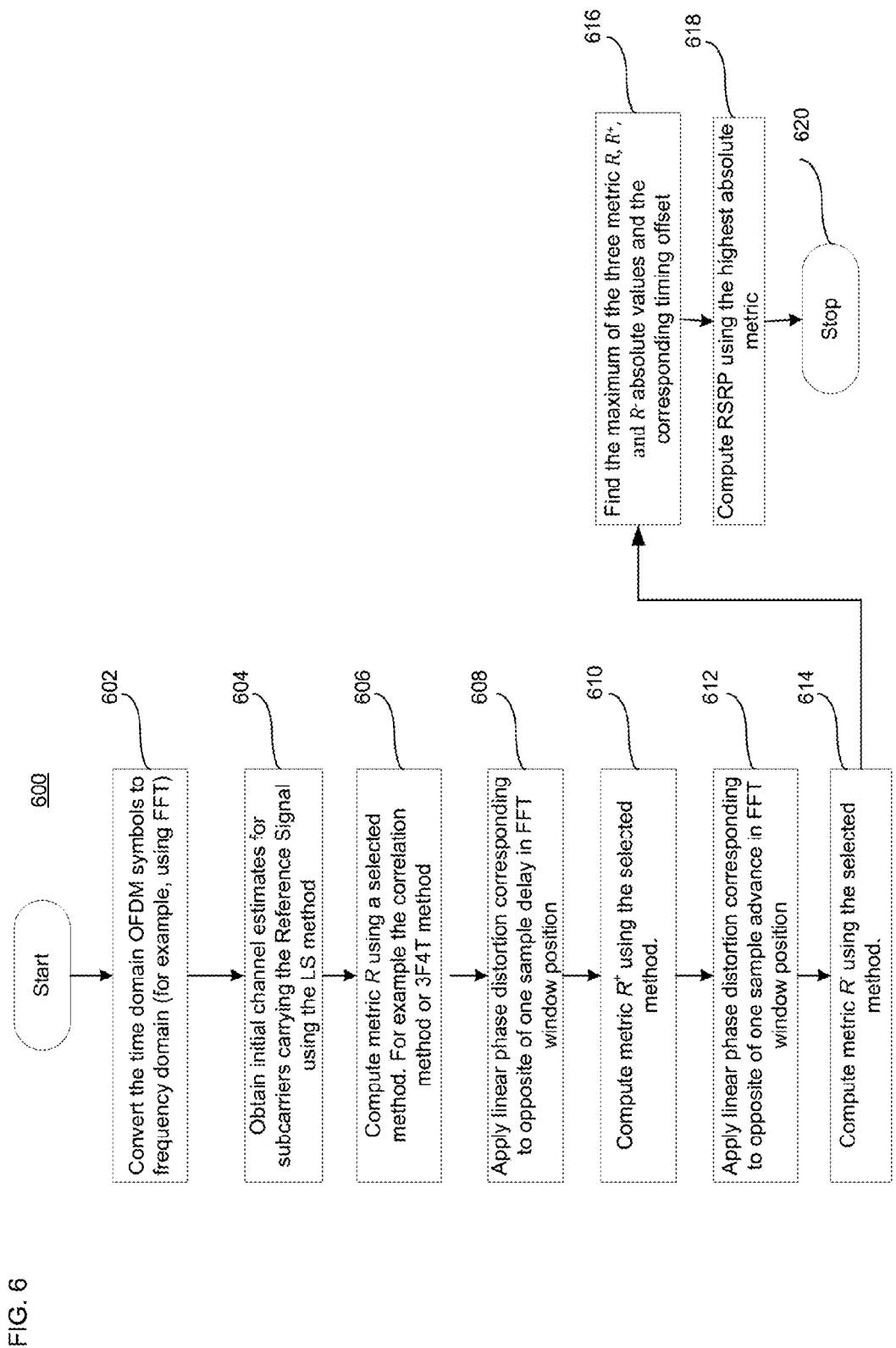
FIG. 6 illustrates an example flow diagram for processing steps according to aspects of the present invention.

The flow diagram 600 contained in FIG. 6 illustrates an example of the RSRP estimation method according to aspects of the present invention. The processing relevant to the present invention begins in processing stage 602, where the received time domain OFDM symbols are converted into frequency domain. The conversion may be performed using an FFT. The number of OFDM symbols converted to the frequency domain corresponds to the number of OFDM symbols used in the RSRP estimation. In processing stage 604 the initial channel estimates for the subcarriers carrying the RS are obtained, for example using the LS method as described earlier. At processing stage 606, the metric R is computed using the correlation method, the 3F4T method, or any other method with the LS channel estimates $\hat{h}_k$ as inputs. At processing stage 608, linear phase distortion corresponding to the opposite of one sample delay in the FFT window position is applied to the LS channel estimates $\hat{h}_k$. At processing stage 610, the metric $R^+$ is computed using the correlation method, the 3F4T method, or any other method with the phase distorted LS channel estimates $\hat{h}_k$ obtained from processing stage 608 as inputs. At processing stage 612, linear phase distortion corresponding to the opposite of one sample advance in the FFT window position is applied to the LS channel estimates $\hat{h}_k$. At processing stage 614, the metric $R^-$ is computed using the correlation method, the 3F4T method, or any other method with the phase distorted LS channel estimates $\hat{h}_k$ obtained from processing stage 612 as inputs. At processing stage 616, the maximum of the absolute value of the three metrics R, $R^+$, and $R^-$ is computed and the maximum is selected. The timing offset corresponding to the maximum is used as an estimate of the reference timing drift for the neighbor cell being measured. At processing stage 618, the RSRP is computed based on the maximum metric in processing stage 616. The RSRP estimation and reference timing drift estimation stops at stage 620.

The aspects of the present invention were described using 3GPP LTE based OFDM system. While the RSRP metric was used for illustration purposes, the same aspects apply to other neighbor cell measurements such as Reference Signal Receive Quality (RSRQ). The RSRQ is derived from RSRP and the Received Signal Strength Indicator (RSSI) as defined in 3GPP LTE specifications. The aspects of the present invention are applicable to other OFDM based wireless communication systems such as the ones based on IEEE 802.16 and IEEE 802.20 standards, or any other OFDM based wireless communication system.

By way of example only, the above-described method may be implemented in a receiver, e.g., a user device such as a wireless mobile station (MS) 12 as shown in FIG. 1.

Figure 7:
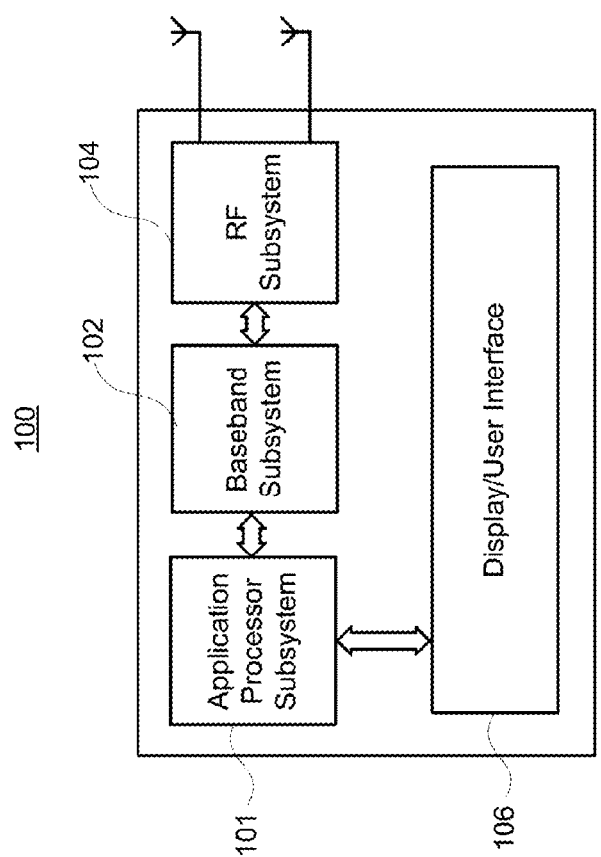
FIG. 7 illustrates a wireless mobile station diagram, which may be employed with aspects of the invention described herein.

As shown in FIG. 7, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 8:
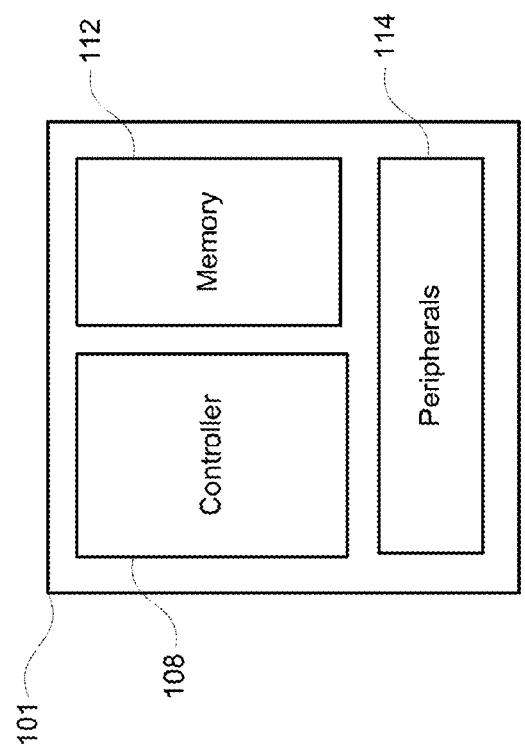
FIG. 8 illustrates an application processor subsystem for a wireless mobile station, which may be employed with aspects of the invention described herein.
Figure 9:
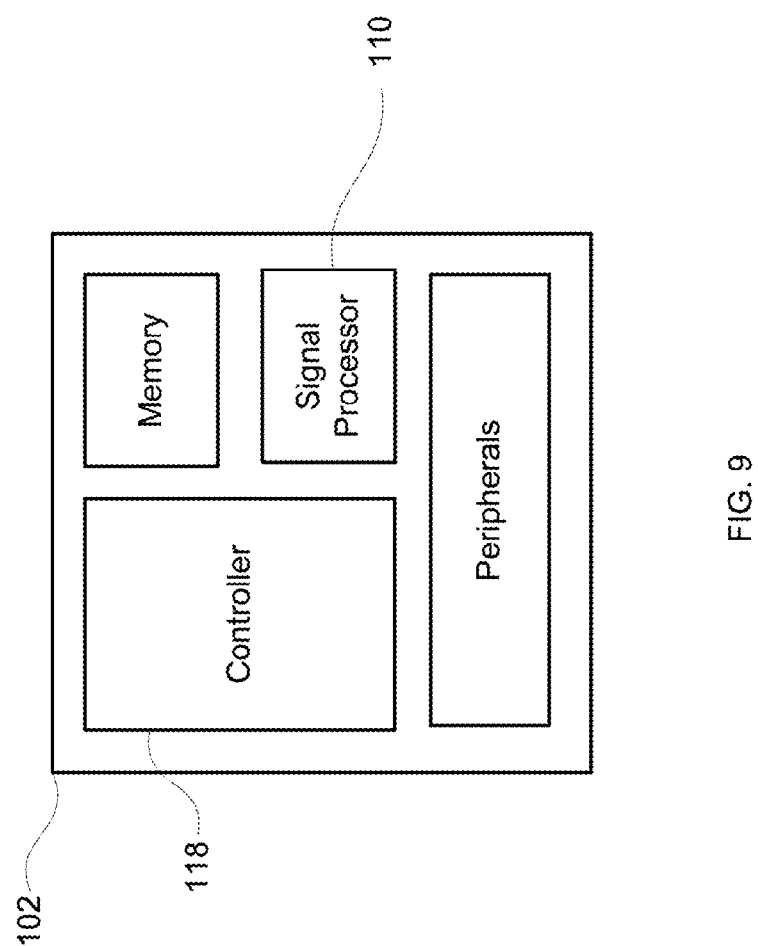
FIG. 9 illustrates a baseband subsystem for a wireless mobile station, which may be employed with aspects of the invention described herein.
Figure 10:
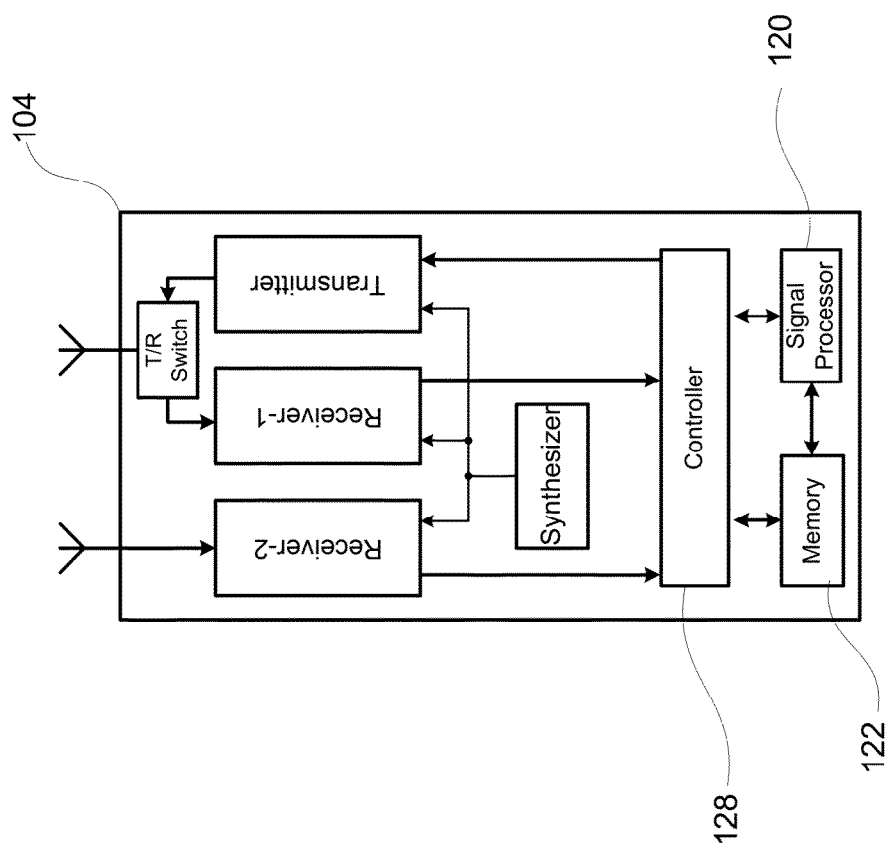
FIG. 10 illustrates an RF subsystem for a wireless mobile station, which may be employed with aspects of the invention described herein.

The application processor subsystem 101 as shown in FIG. 8 may include a controller 108 such as a microcontroller or other processor. The baseband subsystem 102 as shown in FIG. 9 may include a controller 118 such as a microcontroller or other processor. The RF subsystem 104 as shown in FIG. 10 may include a controller 128 such as a microcontroller or other processor. The controller 108 desirably handles overall operation of the MS 100. This may be done by software or firmware running on the controller 108. Such software/firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 9 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

Consumer electronics devices that may incorporate aspects of the invention may include, but are not limited to, smartphones, tablets, laptops, gaming consoles, cameras, video camcorders, TV, car entertainment systems, etc.

In accordance with such aspects of the present invention, the neighbor cell tracking may be applied to various wireless communication systems such as systems based on an IEEE 802.16 wireless communication standard, an IEEE 802.11 wireless communication standard, an IEEE 802.20 wireless communication standard, or a Long Term Evolution (LTE), a 3GPP wireless communication standard.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method of tracking neighbor cells associated with a wireless device in a wireless communication system, the method comprising:

receiving, at the wireless device, a plurality of Orthogonal Frequency Division Multiplexing (OFDM) symbols from one or more transmitting devices in the wireless communication system;

deriving from the OFDM symbols, using one or more processing devices, initial channel estimates for subcarriers carrying a set of reference signals;

determining, using the one or more processing devices, a first metric (R) from the initial channel estimates;

determining, using the one or more processing devices, a second metric ($R^+$) from the initial channel estimates, the second metric $R^+$ incorporating a predetermined linear phase distortion corresponding to a timing delay;

determining, using the one or more processing devices, a third metric ($R^-$) from the initial channel estimates, the third metric $R^-$ incorporating a predetermined linear phase distortion corresponding to a timing advance;

selecting, using the one or more processing devices, a maximum metric from among the first metric R, the second metric R⁺ and the third metric R⁻, the selected maximum metric having a corresponding timing offset;

estimating from the timing offset, using the one or more processing devices, a reference timing drift for a given one of the neighbor cells;

determining, using the one or more processing devices, a reference metric from the maximum metric; and using the estimated reference timing drift and the determined reference metric to assist the wireless communication device in tracking the neighbor cells for handover or cell reselection.

2. The method of claim 1, wherein:

the first, second and third metrics are either Reference Signal Received Power (RSRP) metrics or Reference Signal Receive Quality (RSRQ) metrics.

3. The method of claim 2, wherein the first, second and third metrics are the RSRP metrics determined using different linear phase offsets from a single frequency domain signal obtained using a single Fast Fourier Transform (FFT).

4. The method of claim 1, wherein:

the second metric R⁺ is determined using a predetermined Fast Fourier Transform (FFT) length, and the predetermined linear phase distortion delay corresponds to an opposite of one sample delay in a window position of the FFT; and the third metric R⁻ is determined using the predetermined FFT length, and the predetermined linear phase distortion advance corresponds to an opposite of one sample advance in the window position of the FFT.

5. The method of claim 4, wherein an FFT position offset corresponding to the selected maximum metric is identified as an error or drift in a position of the given neighbor cell.

6. The method of claim 5, further comprising using the FFT position offset to obtain a new estimate of reference timing of the given neighbor cell by updating a previous reference timing by an amount equal to the timing offset.

7. The method of claim 1, further comprising updating reference timing of the given neighbor cell without using Primary Synchronization Signal (PSS) and Secondary Synchronization Signal (SSS) detection for already-identified neighbor cells.

8. The method of claim 7, further comprising using the updated reference timing of a selected neighbor cell when performing a next power measurement on the selected neighbor cell.

9. A wireless communication apparatus configured to track neighbor cells in a wireless communication system, the apparatus comprising:

a plurality of receive chains configured to receive signals including a plurality of Orthogonal Frequency Division Multiplexing (OFDM) symbols from a transmitting device; and one or more processing devices operatively coupled to the plurality of receive chains, the one or more processing devices being configured to:

derive, from the OFDM symbols, initial channel estimates for subcarriers carrying a set of reference signals;

determine a first metric (R) from the initial channel estimates;

determine a second metric (R⁺) from the initial channel estimates, the second metric R⁺ incorporating a predetermined linear phase distortion corresponding to a timing delay;

determine a third metric (R⁻) from the initial channel estimates, the third metric R⁻ incorporating a predetermined linear phase distortion corresponding to a timing advance;

select a maximum metric from among the first metric R, the second metric R⁺ and the third metric R⁻, the selected maximum metric having a corresponding timing offset;

estimate, from the timing offset, a reference timing drift for a given one of the neighbor cells;

determine a reference metric from the maximum metric; and use the estimated reference timing drift and the determined reference metric to assist the wireless communication apparatus in tracking the neighbor cells for handover or cell reselection.

10. The apparatus of claim 9, wherein the first, second and third metrics are Reference Signal Received Power (RSRP) metrics determined using different linear phase offsets from a single frequency domain signal obtained using a single Fast Fourier Transform (FFT).

11. The apparatus of claim 9, wherein:

the second metric R⁺ is determined using a predetermined Fast Fourier Transform (FFT) length, and the predetermined linear phase distortion delay corresponds to an opposite of one sample delay in a window position of the FFT; and the third metric R⁻ is determined using the predetermined FFT length, and the predetermined linear phase distortion advance corresponds to an opposite of one sample advance in the window position of the FFT.

12. The apparatus of claim 11, wherein an FFT position offset corresponding to the selected maximum metric is identified as an error or drift in a position of the given neighbor cell.

13. The apparatus of claim 9, wherein the one or more processing devices are further configured to update reference timing of the given neighbor cell without using Primary Synchronization Signal (PSS) and Secondary Synchronization Signal (SSS) detection for already-identified neighbor cells.

14. The apparatus of claim 13, wherein the one or more processing devices are further configured to use the updated reference timing of a selected neighbor cell when performing a next power measurement on the selected neighbor cell.

15. A wireless communication receiver element configured to track neighbor cells in a wireless communication system, the wireless communication receiver element comprising:

one or more processing devices configured to obtain, from a plurality of receive chains of a wireless communication device, a plurality of received Orthogonal Frequency Division Multiplexing (OFDM) symbols;

the one or more processing devices being configured to:

derive, from the OFDM symbols, initial channel estimates for subcarriers carrying a set of reference signals;

determine a first metric (R) from the initial channel estimates;

determine a second metric (R⁺) from the initial channel estimates, the second metric R⁺ incorporating a predetermined linear phase distortion corresponding to a timing delay;

determine a third metric (R⁻) from the initial channel estimates, the third metric R⁻ incorporating a predetermined linear phase distortion corresponding to a timing advance;

select a maximum metric from among the first metric R, the second metric R⁺ and the third metric R⁻, the selected maximum metric having a corresponding timing offset;

estimate, from the timing offset, a reference timing drift for a given one of the neighbor cells;

determine a reference metric from the maximum metric; and use the estimated reference timing drift and the determined reference metric to assist the wireless communication device in tracking the neighbor cells for handover or cell reselection.

16. The wireless communication receiver element of claim 15, wherein the first, second and third metrics are Reference Signal Received Power (RSRP) metrics determined using different linear phase offsets from a single frequency domain signal obtained using a single Fast Fourier Transform (FFT).

17. The wireless communication receiver element of claim 15, wherein:

the second metric $R^+$ is determined using a predetermined Fast Fourier Transform (FFT) length, and the predetermined linear phase distortion delay corresponds to an opposite of one sample delay in a window position of the FFT; and the third metric $R^-$ is determined using the predetermined FFT length, and the predetermined linear phase distortion advance corresponds to an opposite of one sample advance in the window position of the FFT.

18. The wireless communication receiver element of claim 17, wherein an FFT position offset corresponding to the selected maximum metric is identified as an error or drift in a position of the given neighbor cell.

19. The wireless communication receiver element of claim 15, wherein the one or more processing devices are further configured to update reference timing of the given neighbor cell without using Primary Synchronization Signal (PSS) and Secondary Synchronization Signal (SSS) detection for already-identified neighbor cells.

20. The wireless communication receiver element of claim 19, wherein the one or more processing devices are further configured to use the updated reference timing of a selected neighbor cell when performing a next power measurement on the selected neighbor cell.

* * * * *